United States Patent
Fontaine et al.

(10) Patent No.: US 9,715,628 B2
(45) Date of Patent: Jul. 25, 2017

(54) METHOD FOR ESTIMATING A DISTANCE FROM A FIRST COMMUNICATION DEVICE TO A SECOND COMMUNICATION DEVICE, AND CORRESPONDING COMMUNICATION DEVICES, SERVER AND SYSTEM

(71) Applicant: THOMSON LICENSING, Issy de Moulineaux (FR)

(72) Inventors: Patrick Fontaine, Rennes (FR); Stephane Gouache, Cesson Sevigne (FR); Vincent Demoulin, Montfort sur Meu (FR)

(73) Assignee: THOMSON LICENSING, Issy-les Moulineaux (FR)

( * ) Notice: Subject to any disclaimer, the term of this patent is extended or adjusted under 35 U.S.C. 154(b) by 0 days.

(21) Appl. No.: 14/749,582

(22) Filed: Jun. 24, 2015

(65) Prior Publication Data
US 2015/0379352 A1 Dec. 31, 2015

(30) Foreign Application Priority Data

Jun. 27, 2014 (EP) .................................... 14306021

(51) Int. Cl.
*G06K 9/00* (2006.01)
*G01C 3/06* (2006.01)
(Continued)

(52) U.S. Cl.
CPC .......... *G06K 9/00671* (2013.01); *G01C 3/06* (2013.01); *G01C 3/22* (2013.01); *G01S 11/12* (2013.01); *H04W 4/025* (2013.01)

(58) Field of Classification Search
CPC ........ G06K 9/00671; G01C 3/06; G01C 3/22; G01S 11/12; H04W 4/025
See application file for complete search history.

(56) References Cited

U.S. PATENT DOCUMENTS 6,370,475 B1 * 4/2002 Breed .................. B60N 2/2863
340/436
6,631,120 B1 * 10/2003 Milbrandt ............... H04L 29/06
370/252
(Continued)

FOREIGN PATENT DOCUMENTS

JP 200283297 3/2002

OTHER PUBLICATIONS

Socher etal—"3-D reconstruction and camera calibration from images with known objects"—BMVC '95 Proceedings of the 6th British Machine Vision Conference—Sep. 11-14, 1995; pp. 167-176.
(Continued)

Primary Examiner — Shefali Goradia
(74) Attorney, Agent, or Firm — Volpe and Koenig, P.C.

(57) ABSTRACT

The invention concerns a method for estimating a distance from a first communication device to a second communication device. According to an aspect of the invention, the method comprises:
Taking a picture of the second communication device by the first communication device;
Obtaining a description of the second communication device;
Identifying the second communication device in the picture, by using said description;
Estimating a distance from the first communication device to the second communication device by using the description of the second communication device and dimensions of the second communication device identified in the picture.

13 Claims, 3 Drawing Sheets

(51) Int. Cl.
*G01C 3/22* (2006.01)
*G01S 11/12* (2006.01)
*H04W 4/02* (2009.01)

(56) References Cited

U.S. PATENT DOCUMENTS

| | | | | |
|---|---|---|---|---|
| 6,711,293 | B1 | 3/2004 | Lowe | |
| 7,446,702 | B2* | 11/2008 | Huang | G01C 21/20 342/357.31 |
| 7,629,899 | B2* | 12/2009 | Breed | B60N 2/2863 340/435 |
| 2002/0001398 | A1 | 1/2002 | Shimano et al. | |
| 2006/0189348 | A1* | 8/2006 | Montulli | H04N 1/00244 455/556.1 |
| 2007/0198632 | A1* | 8/2007 | Peart | H04L 12/2812 709/203 |
| 2007/0206175 | A1 | 9/2007 | Rai et al. | |
| 2010/0157135 | A1* | 6/2010 | Dossaji | G02B 7/36 348/348 |
| 2012/0075485 | A1 | 3/2012 | Mizutani et al. | |
| 2012/0117193 | A1* | 5/2012 | Phillips | H04W 4/00 709/219 |
| 2012/0209513 | A1* | 8/2012 | Walker | G06K 9/00677 701/431 |
| 2012/0311096 | A1* | 12/2012 | Hurley | H04L 67/06 709/219 |
| 2016/0049008 | A1* | 2/2016 | Haddick | G02B 27/0172 345/633 |
| 2016/0117553 | A1* | 4/2016 | Liu | G06K 9/00577 382/159 |

OTHER PUBLICATIONS https://itunes.preview apple.com"EasyMeasure—Measure with your Camera!" on the App Store on iTunes; Nov. 19, 2013; pp. 1-7.
http://benkamens.com"RulerPhone—Measure anything your iPhone can take a picture of."; Nov. 19, 2013; pp. 1-5.
Haines—"A rough guide to shape from shading"—Jun. 14, 2012; pp. 1-51.
Yu etal—"Relative Distance Estimation for Indoor Multi-Robot Control Using Monocular Digital Camera"—2009—Open Publications of UTS Scholars (OPUS); pp. 1-6.
Wang—"3D Shape and motion analysis from image blur and smear: a unified approach"—Computer Vision, 1998. Sixth International Conference on Jan. 4-7, 1998; pp. 1-6.
http://www.realitycap.com/"Capture and use 3D data in your iOS apps"; Jun. 8, 2015; pp. 1-3.
http://www.generation-nt.com;"pelican-imaging-capteur-photo-smartphone-tablette-actualite"—1156531.html; Feb. 9, 2011; pp. 1-3.
http://en.wikipedia.org/wiki/"Outline of object recognition"; Jun. 8, 2015; pp. 1-7.
http://en.wikipedia.org/wiki; "Pinhole camera model"; Jun. 8, 2015; pp. 1-5.
Koelzow etal—"Matching of a 3D model into a 2D image using a hypothesize and test alignment method"—Proceedings of the SPIE—The International Society for Optical Engineering—vol. 4791, pp. 222-232—Dec. 1, 2002.
Search Report Dated Oct. 28, 2014.
Kasvand T. et al, Segmentation, Learning and Recognition of Objects in Range Camera Images, Computer Vision, Jun. 18-20, 1985, pp. 389-400, Proceedings of the 4th Canadian CAD/CAM and Robotics Conference, Toronto, Ontario.

* cited by examiner

METHOD FOR ESTIMATING A DISTANCE FROM A FIRST COMMUNICATION DEVICE TO A SECOND COMMUNICATION DEVICE, AND CORRESPONDING COMMUNICATION DEVICES, SERVER AND SYSTEM

This application claims the benefit, under 35 U.S.C. §119 of European Patent Application No. 14306021.8 filed Jun. 27, 2014.

1. FIELD OF THE INVENTION

The invention relates to the field of communication devices, notably, but non exclusively, in a context of distributed cooperative applications. More precisely, the invention relates to a method for estimating the relative distance between two communication devices located within line of sight.

2. BACKGROUND

There are several known techniques for estimating the relative distance between two communication devices.

When both devices are equipped with a GPS (for "Global Positioning System") module, the GPS signal may be used for such a purpose. However, the GPS signal is not available in an indoor context.

It is also possible to use triangulation techniques, based for example on Wi-Fi® signals. However, the accuracy of the measurement is poor. The same drawback is encountered when using position sensors, such as accelerometers or gyroscopes, embedded in the communication devices.

Communication devices, such as smartphones, are more and more frequently equipped with a camera. An interesting approach could hence make use of the camera to derive a method for estimating the relative distance between two communication devices on the basis of pictures taken by one of the devices.

Distance evaluation from pictures has been widely studied in the past. Among the numerous methods, which were suggested, Ying-Hao Yu et al. described in 2009 in "*Relative Distance Estimation for Indoor Multi-Robot Control Using Monocular Digital Camera*", *The University of Tasmania, Tasmania, Australia*, pp. 1-6, *Proceedings of the $3^{rd}$ International Workshop on Artificial Intelligence in Science and Technology*, an approach relying on a single picture taken with known camera parameters, in which a checkerboard with known physical dimensions was first inserted in the scene, prior to taking the picture.

More precisely, in this article, the authors describe a relative distance measurement algorithm for monocular cameras. By detecting 2D labels on the top of indoor robots, and by assuming that the floor is flat, the algorithm can estimate the relative distance between robots by calculating the perspective projection image ratio (PIPR) of labels.

A similar method is used in the application called Ruler-Phone (see http://benkamens.com/rulerphone/), which may be downloaded on smartphones, and which allows the user to measure any object his/her smartphone can take a picture of. To this purpose, the user needs to place any card with the exact dimensions of a credit card next to or in front of the object he/she would like to measure. He/she then needs to align the card with a blue card placeholder that RulerPhone displays on the screen, and, if needed, he/she must zoom the image until the card in the picture is the same size as the RulerPhone's blue card placeholder. Once the cards are aligned, the smartphone takes a picture, and uses the known dimensions of the card to estimate the dimensions of the object the user wishes to measure.

Such a method does not aim at estimating a distance between two objects, but rather at estimating the dimensions of an object. It is however close from the method described by Ying-Hao Yu et al., in that it relies on a picture taken by a monocular camera, and on the use of an object with known physical dimensions to make some measurement.

Though interesting, a drawback of both methods is that it is necessary to insert an object with known physical dimensions in the scene. The use of such methods is therefore restricted to a limited number of cases, where either an object with known physical dimensions is present in the scene, or where a user may interact with the method to insert such a known object in the scene, prior to taking a picture.

Moreover, it may be cumbersome for the user to align precisely the reference object with known physical dimensions with the object he/she wants to measure.

It would hence be desirable to provide a method for estimating the distance between communication devices showing improvements over the prior art.

Notably, it would be desirable to provide such a method, which would not rely on any action from a user, and would thus particularly fit Machine-to-Machine applications.

It would also be desirable to provide such a method, which would not rely on any pre-existing knowledge about the object, whose distance is to be measured.

3. SUMMARY

In one particular embodiment of the invention, a method for estimating a distance from a first communication device to a second communication device is proposed, which comprises:
  Taking a picture of the second communication device by the first communication device;
  Obtaining a description of the second communication device, said description comprising at least one piece of information about the second communication device;
  Identifying at least part of the second communication device in said picture, by using said description;
  Estimating a distance from the first communication device to the second communication device by using:
    said at least one piece of information about the second communication device,
    at least one camera parameter used for taking the picture of the second communication device, and
    dimensions of said at least part of the second communication device identified in said picture.

The present invention thus relies on a novel and inventive approach of the distance estimation between two devices. Actually, such a method does not rely on any pre-existing knowledge about the second communication device, whose distance is to be measured. It makes an advantageous use of some communication means embedded in the first communication device to acquire information about the distant second communication device, as well as of the camera sensor, which is nowadays embedded in most of the communication devices.

By communication device, it is meant here and throughout this document, any device equipped with a communication module, whatever the technology or standard used by such a communication module. Among others, such a communication module could be of the WiFi® type, Bluetooth, zigbee, NFC, etc. As a mere example, such a communication device could be a smartphone, a TV set, a pad, a computer, a domestic appliance.

According to an embodiment of the present invention, said description of the second communication device comprises at least one reference picture of at least part of the second communication device and at least one piece of information on dimensions of at least part of the second communication device. Said at least one piece of information on dimensions of at least part of the second communication device is used when estimating a distance from the first communication device to the second communication device.

Such a reference picture may be a 2D or a 3D picture, such as, for example, a 3D model of the second communication device.

According to an embodiment of the present invention, said description of the second communication device is received by the first communication device through a wireless link established between said first and said second communication devices. The description of the second communication device is embedded in the second device itself, and it is transmitted to the first communication device when needed. The first communication device does not need to have any pre-existing knowledge about the second communication device, contrarily to the known prior art techniques. It may easily receive the description of the second communication device through a wireless link, for example of the WiFi® type.

According to another embodiment of the present invention, said first communication device sends a request for said description to the second communication device. Such an embodiment is advantageous when the first communication device is associated through a wireless protocol with the second communication device before starting the measurement process according to the present invention. The first communication device can then directly request the description of the second communication device. It is also interesting when the first communication device knows an identifier of the second communication device (e.g. MAC address, IP address, phone number, . . . ): it can then directly request a full description of the second communication device through a wireless protocol.

According to another embodiment of the present invention, said first communication device broadcasts a request for description, and receives at least one description response from at least one second communication device. In this alternative embodiment, the first communication device is not associated to the second communication device, and broadcasts a request for description towards all the communication devices surrounding it. Such a request may be based on a discovery protocol (Bonjour, Network Service Discovery, . . . ), or on a Publish/subscribe Protocol (XMPP, Qeo Data Model, . . . ) or on a proprietary format protocol. Such a request can include a field "object description request".

The second communication device receives the request and responds to the first communication device with its description response. If multiple objects receive the description request, the first communication device may then receive multiple responses.

By description response, it is meant here and throughout the present document, a response to the description request broadcasted by the first communication device. Such a description response may consist in a description of the second communication device. It may also consist in an identification parameter of the second communication device, such as, for example, an RF ID.

Actually, according to an embodiment of the invention, the first communication device retrieves said description of the second communication device from a database, which it addresses on the basis of an identification parameter of said second communication device. Hence, when receiving a description request from the first communication device, the second communication device responds with an identification parameter, and the first communication device will retrieve the description of the second communication device on a distant database, based on the ID of the second communication device.

According to an embodiment of the invention, such a description comprises at least one of the following elements:
a three-dimensional model of at least part of the second communication device;
a physical length of the second communication device;
a physical width of the second communication device;
a physical height of the second communication device;
a reference picture of at least part of the second communication device;
a scale associated with the reference picture;
a type of the second communication device;
a network interface of the second communication device;
information on a position of the second communication device;
information on a mobility feature of the second communication device.

Such a description may preferably contain a picture (i.e. a view of part of or of the entire second communication device, in one angle) and an associated scale (in order to determine the real dimensions of the second communication device). A description may of course also contain more than one picture and associated scale (in different angles or for different parts of the device). Among the pictures contained in the description, it is advantageous, but not compulsory, if one of the pictures contains a part of the object that fits in one (2D) plane.

According to yet another embodiment of the invention, the step of identifying at least part of the second communication device implements an object recognition algorithm on the basis of said at least one reference picture. The first communication device hence runs an object recognition algorithm using one or several views of the second communication device provided in its description. Such an object-recognition algorithm may rely on an edge-matching method, such as, for example the Canny edge detection, or on a Divide-and-Conquer search. It must be noted that any object recognition algorithm may be used in the context of the present embodiment of the invention and that the methods cited above are mere examples.

According to yet another embodiment, the method also comprises:
matching a portion of said at least part of the second communication device identified in said picture with a portion of said reference picture comprised in said description; and
computing a number of pixels associated to the matched portion in said picture.

Hence, a portion of the device in the picture is directly matched with a portion of its description (which means that the device has been recognized in the picture). As an alternate embodiment, the second communication device is first recognized in the picture taken by the first communication device, and then, the latter more precisely matches a portion of the second communication device in the picture with a portion of its description. In yet another embodiment, several portions of the description may be used to match corresponding portions of the device in the picture which was taken.

In all these embodiments, for example, the first communication device matches an edge of the smartphone in the picture with the same edge in the received description, taking into account their orientation in both pictures. It then computes the number of pixels of the edge on the picture it has taken, and associates this number of pixels to the real dimensions of the edge, as known from the description.

According to yet another embodiment, estimating the distance d from the first communication device to the second communication device uses the pinhole projection formula:

$$d = f \times \frac{X}{x}$$

where:
f is a focal length of the camera,
X is a real height of said matched portion, of the second communication device,
x is a height of said matched portion in said picture.

d, f, X, x are expressed in millimeters. The height x of the matched portion in the picture in millimeters may be derived from the height of the matched portion in the picture expressed in number of pixels, knowing both the image height expressed in number of pixels and the camera sensor height expressed in millimeters.

According to yet another embodiment, said at least one camera parameter belongs to the group comprising:
  a focal of said camera;
  a lens size of said camera;
  an orientation of said camera;
  a time at which said camera took the picture.

In a particular embodiment of the present invention, the method also comprises:
  receiving from said second communication device an estimated distance from the second communication device to the first communication device;
  comparing said estimated distance received from said second communication device with the distance estimated by said first communication device.

Thus, the first communication device can improve the accuracy of the distance estimation, or it can disambiguate between multiple second communication devices in range. If both estimated distances fit, the first communication device may validate its distance estimation. Otherwise, if the estimated distances notably differ from each other, the first communication device may try to connect to another second communication device in range. It may also try to match the second communication device in another part of the picture.

In an embodiment of the present invention, the steps of taking a picture, identifying and estimating a distance are carried out for several second communication devices, and the method comprises a step of computing a distance between at least two of said second communication devices.

Actually, on the basis of the estimated distances between the first communication device and several second communication devices, the first communication device can derive an estimated distance between any two second communication devices, which may be interesting, for example, in a case where all communication devices take part together to an interactive game. Such a computation may advantageously use an angle between the different estimated distances, which may be obtained using a gyroscope embedded in the first communication device.

In another embodiment of the present invention, which may be an alternative or a complement to the previous one, the steps of taking a picture, identifying and estimating a distance are carried out for several second communication devices, and the method comprises a step of estimating a position of said first communication device on the basis of the distances estimated between said first communication device and each of said second communication devices.

Actually, on the basis of the estimated distances between the first communication device and several second communication devices, the first communication device can derive its own position in the room or the environment in which it is located. Such a position may consist in a relative positioning, or be of the type "closer to this than . . . ". If positions of the second devices in a reference are known (for example, known in advance, or present in the description), triangulation techniques may allow deriving an absolute position of the first device in this reference.

According to another embodiment of the invention, the steps of identifying at least part of a second communication device and of estimating a distance are carried out for at least two second communication devices, and the method also comprises presenting said at least two communication devices to a user in order for him/her to select a preferred second communication device.

Hence, in the case where at least two descriptions match in the picture, the relative distances to the first communication device can be computed for each second communication device. If the application needs to identify only one object, the user can select the correct second communication device. To this purpose, the first communication device may either present to the user a list of the two or more second communications devices with their names (which may be retrieved from the descriptions), or may highlight the identified objects in the picture displayed on the first communication device's screen, in order for the user to select the correct second communication device on the screen.

According to another embodiment of the invention, the steps of identifying at least part of a second communication device and of estimating a distance are carried out by said first communication device or by a remote server.

Hence, aspects of the method for estimating a distance according to the present invention may either be wholly implemented in the first communication device, or may be partly offloaded from the first communication device to a distant server, in order to implement a server assisted distance computation. This alternate embodiment is interesting when the processing unit of the first communication device is not powerful enough.

The present invention furthermore relates to a communication device comprising a camera and a communication module, which also comprises:
  a memory for at least temporarily memorizing a picture of a second communication device taken by the camera;
  a recognition module for identifying at least part of the second communication device in said picture, by using a description of the second communication device, said description comprising at least one piece of information about the second communication device;
  an estimation module for estimating a distance from the first communication device to the second communication device by using:
    said at least one piece of information about the second communication device,
    at least one camera parameter used for taking the picture of the second communication device, and
    dimensions of said at least part of the second communication device identified in said picture, and said communication module comprises a receiver for receiving said description.

All features of the description of the second communication device described above in relation to embodiments of the method of estimating a distance also apply to such a communication device.

The present invention furthermore relates to a server for estimating a distance from a first communication device to a second communication device, which comprises:
- a receiver for receiving from a first communication device a picture taken by the first communication device, a distance measurement request and at least one camera parameter used for taking the picture;
- a database comprising at least one description of at least one second communication device, said description comprising at least one piece of information about the second communication device;
- a recognition module for identifying in said picture at least part of at least one second communication device, which description is comprised in said database, by using said description of the second communication device,
    - an estimation module for estimating a distance from the first communication device to every second communication device at least partly identified in said picture, said estimation module using:
        - said at least one piece of information about the second communication device,
        - said at least one camera parameter used for taking the picture of the second communication device, and
        - dimensions of said at least part of the second communication device identified in said picture;
    - a transmitter for transmitting to the first communication device a list of every second communication device at least partly identified in said picture associated to a corresponding estimated distance.

All features of the description of the second communication device described above in relation to embodiments of the method of estimating a distance also apply to such a server.

The present invention furthermore relates to a system for estimating a distance from a first communication device to a second communication device, which comprises:
    said first communication device comprising:
        - a camera for taking a picture of the second communication device;
        - a communication module comprising a receiver for receiving a description of the second communication device, said description comprising at least one piece of information about the second communication device;
        - a recognition module for identifying at least part of the second communication device in said picture, by using said description;
        - an estimation module for estimating a distance from the first communication device to the second communication device by using:
            - said at least one piece of information about the second communication device,
            - at least one camera parameter used for taking the picture of the second communication device, and
            - dimensions of said at least part of the second communication device identified in said picture, and
    a second communication device comprising a communication module comprising a receiver for receiving a description request from said first communication device, and a transmitter for transmitting to said first communication device said description or an identifier of said second communication device.

All features of the description of the second communication device described above in relation to embodiments of the method of estimating a distance also apply to such a system.

The present invention furthermore relates to a computer program product downloadable from a communications network and/or stored in a computer-readable carrier and/or executable by a microprocessor, which comprises program code instructions for the execution of the method for estimating a distance as described above, when it is executed on a computer.

4. BRIEF DESCRIPTION OF THE DRAWINGS

The invention can be better understood with reference to the following description and drawings, given by way of example and not limiting the scope of protection, and in which.

The components in the figures are not necessarily to scale, emphasis instead being placed upon illustrating the principles of the invention.

5. DETAILED DESCRIPTION

The method for estimating the relative distance between two communication devices according to the present invention relies on the assumption that most communication devices are nowadays equipped with both a camera and a communication module. It thus makes an advantageous use of both features to implement a solution, in which a first communication device takes a picture of a second communication device, acquires information about this distant device, and combines both to estimate the distance between both devices.

Figure 1:
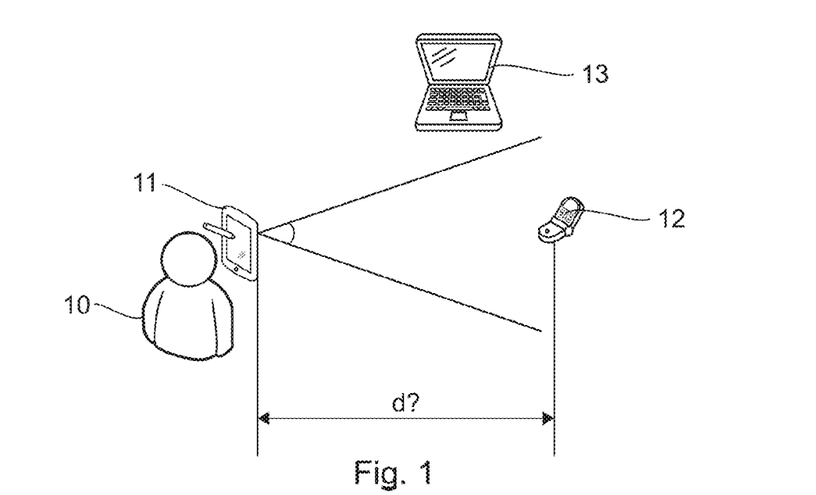
FIG. 1 illustrates the general principle of a method for estimating a distance between two communication devices, according to an embodiment of the invention.

FIG. 1 illustrates schematically this general principle. A user 10 is equipped with a first communication device 11, for example a touch pad. He/she is located in a room, where several other communication devices are also present, such as a smartphone 12 and a laptop 13. Though particularly interesting in an indoor context, it must be noted that the method according to embodiments of the invention may also apply in an outdoor context.

According to an embodiment of the invention, the user 10 uses its touchpad 11 to take a picture of the smartphone 12, in order to estimate the distance d between the touchpad 11 and the smartphone 12. In the same way, and though not illustrated on FIG. 1, the user 10 could use its touchpad 11 to take a picture of the laptop 13, in order to estimate the distance d between the touchpad 11 and the laptop 13.

It must be assumed that the touchpad 11 and either the smartphone 12 or the laptop 13 is in line of sight.

When taking the picture, the touchpad 11 memorizes some camera sensor's information, such as its orientation, the time, and some camera parameters.

Figure 2:
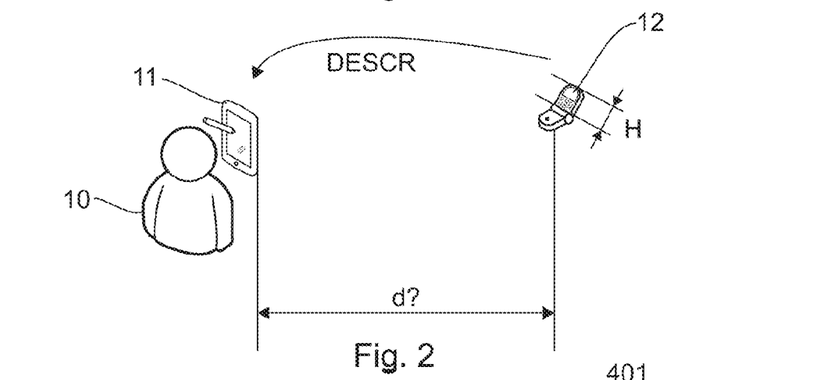
FIG. 2 illustrates the step of obtaining a description of the second communication de vice, according to the embodiment of FIG. 1.

As illustrated by FIG. 2, the smartphone 12 sends its description DESCR to the touchpad 11, through a wireless link. Such a description DESCR may be embedded in the smartphone 12 itself, and transmitted upon request from the touchpad 11. It can include the real dimensions (length, width, height) of the smartphone 12, as well as a 3D model, and pictures of different views of the smartphone 12. In the example of FIG. 2, such a description includes the real height H of the smartphone 12 in a closed position.

Advantageously, the description DESCR contains pairs of:
- a picture (view of part or entire smartphone 12 in one angle);
- an associated scale (in order to determine real dimensions of the smartphone 12).

It is convenient if the pictures contained in the description DESCR contain a part of the smartphone 12 that fits in one (2D) plane. The description DESCR may also contain additional information, such as the type of the smartphone, the network interface it comprises, . . . . Such information may be useful to discriminate between several communication devices, which would appear on the picture taken by the touchpad 11. The description DESCR may also contain a position indication of the smartphone 12, for example in the form of coordinates, as well as an indication on the smartphone mobility (i.e. an indication on whether the smartphone 12 is a fixed or a mobile object).

Figure 3:
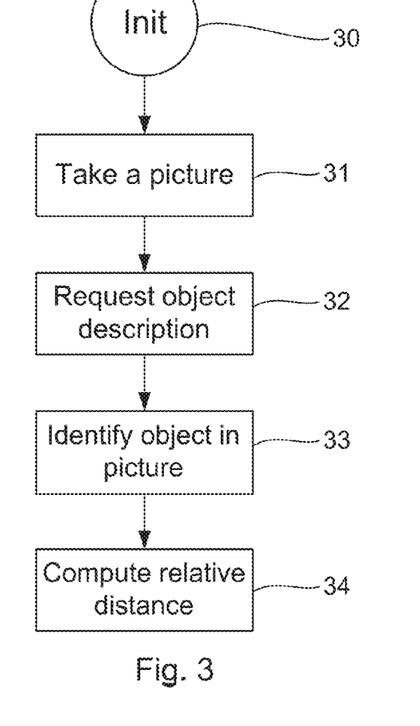
FIG. 3 shows a flow chart of the successive steps implemented by a first communication device according to the embodiment of FIG. 1.

FIG. 3 illustrates in more details the steps implemented by the touch pad 11 according to an embodiment of the invention.

After an initializing step INIT 30, the touchpad 11 takes 31 a picture of the smartphone 12. It then requests 32 an object description of the smartphone 12.

According to a first embodiment, the touchpad 11 is associated with the smartphone 12, through a wireless protocol (Bluetooth, zigbee, wifi®, . . . ), before starting the measuring process. The touchpad 11 can hence directly request the description DESCR of the smartphone 12.

According to a variant of this first embodiment, the touchpad 11 knows an identifier of the smartphone 12 (e.g. MAC address, IP address, name of the smartphone, phone number, RF ID . . . ); it can hence also directly request a full description of the smartphone 12 through a wireless protocol.

According to a second embodiment, the touchpad 11 is not associated with the smartphone 12, and broadcasts a request 32 for description to all the devices within its reach. The request can be:
- based on a discovery protocol (such as Bonjour, Network Service Discovery, Wi-Fi P2P service discovery, Bluetooth . . . );
- based on a Publish/Subscribe protocol (XMPP, Qeo Data Model, . . . );
- based on a proprietary format.

The request 32 can include a field "object description request". The smartphone 12 then receives the request, and responds with its description DESCR. More generally, all the other communication devices within reach of the touchpad 11 (for example the laptop 13) receive the request 32 and respond with their description DESCR.

According to a variant of this second embodiment, the smartphone 12 responds with a unique ID, and the touchpad 11 will retrieve the description DESCR of the smartphone 12 on a distant database, on the basis of this unique ID. According to another variant, the touchpad 11 directly requests 32 a unique ID through a RFID protocol, instead of requesting a description, and retrieves the associated description DESCR on a remote database.

At the end of step 32 of obtaining a description, the touchpad 11 has received or retrieved at least one description DESCR, and may have received multiple responses in case multiple second communication devices are in range.

The touchpad 11 then identifies 33 the smartphone 12 in the picture taken at step 31. To this purpose, the touchpad 11 runs an object recognition algorithm using one or several views of the smartphone 12 provided in the description DESCR. Such an object recognition algorithm may be, for example, based on the matching of interest points, as described in U.S. Pat. No. 6,711,293 patent document.

The touch pad 11 more precisely matches a part of the smartphone 12 in the picture with a part of the description DESCR. For example, it matches an edge of the smartphone 12 in the picture with the same edge in the picture received in the description DESCR. To this purpose, it takes account of the orientation of the smartphone in both pictures. It also computes the number of pixels associated with the matched edge in the picture taken at step 31. This number of pixels will be used in step 34 of computing a relative distance, which will be described hereafter in more details.

Figure 4:
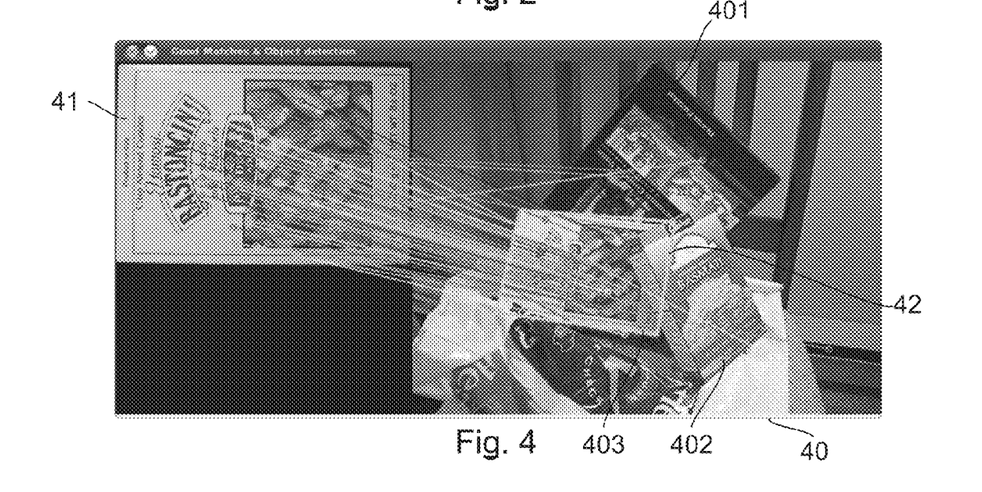
FIG. 4 illustrates the principle of an object recognition algorithm implemented by the first communication device in the embodiment of FIG. 3.

FIG. 4 illustrates in more details the matching process described above. The right side of FIG. 4 shows a picture 40 taken at step 31 by the touchpad 11. Such a picture 40 shows a chair, on which several objects are set, such as a book 401, a pack of rice 402 and a pack of cookies 403. The left side of FIG. 4 shows the description of the object, which the touch pad 11 must recognize on picture 40. In this peculiar example, given as a mere illustrative purpose, such an object is not a communication device but rather the pack of cookies 403. The touch pad 11 uses a simple recognition algorithm, based on local features detection of the pack of cookies 403: such features are shown as circles on picture 40. Such local features are matched between picture 41 and picture 40. The zone of picture 40 in which most circles are detected and matched is indicated by a rectangle 42, which corresponds to the detection in picture 40 of the pack of cookies 403.

Once the smartphone 12 has been identified in the picture at step 33, the touchpad 11 computes 34 the relative distance between the smartphone 12 and the touchpad 11, by using the real dimensions of the smartphone provided in the description DESCR, the size of the smartphone or part of the smartphone identified in the picture (expressed in number of pixels) and some camera information (focal, lens size . . . ). Such a computation 34 can be based on the pinhole projection formula:

$$\frac{x}{f} = \frac{X}{d}$$

where:
d is the distance to the smartphone 12 expressed in mm,
f is the focal length of the camera expressed in mm,
X is the real height of the smartphone 12 expressed in mm,
x is the height of the smartphone 12 in the picture, expressed in mm.
The height of the smartphone 12 in the picture, x, may also be expressed as:

$$x=\text{image height (pixel)}/\text{object height (pixel)}/\text{sensor height (mm)}.$$

In the case where the touchpad 11 is not associated with the smartphone 12 prior to the distance evaluation (according to the second embodiment described above), and as already stated, the touchpad 11 may receive or retrieve multiple object descriptions at step 32. In such a case, the object recognition algorithm can be run for each description DESCR at step 33.

If only one description DESCR matches in the picture, the smartphone 12 has been duly identified, and the relative distance between the smartphone 12 and the touchpad 11 can be estimated, as described above.

However, if at least two descriptions DESCR match in the picture, the touch pad 11 may compute the relative distances for each. This may occur for example if there are two similar smartphones on the picture (same brand, same model). If the application running on the touchpad 11, and which needs to know the estimated distance to the smartphone 12, needs to identify only one object in the picture taken at step 31, the user 10 can select the correct object. The touchpad 11 may display on its screen a list of the two (or more) objects with their name (retrieved from the description DESCR) or it may highlight the identified objects in the picture taken at step 31; the user 10 can then select the correct one.

In an alternative embodiment, the object recognition algorithm implemented at step 33 starts when the user 10 selects a part of the picture, by touching it on the touchpad's screen. The area pointed by the user 10 can help the recognition algorithm reduce the search area in the picture, which may help avoid that multiple descriptions match in the selected area.

According to another interesting embodiment of the invention, the method for estimating a distance of FIG. 3 is also implemented by the smartphone 12, which takes a picture of the touchpad 11, obtains its description DESCR, identifies it in the picture it has taken, estimates a relative distance to the touchpad 11 and sends it to the touchpad 11.

The touchpad 11 may hence compare both estimated distances, respectively computed by the touchpad 11 and by the smartphone 12. Such a comparison may help the touchpad 11 improve the accuracy of the estimated distance.

In case where multiple smartphones 12 are in range, such a comparison allows the touchpad 11 to disambiguate between these smartphones: if both estimated distances are close to each other, the distance estimation is validated. Otherwise, the touchpad 11 must try to connect to another device in range.

According to another interesting embodiment of the invention, the smartphone 12 may also display a notification, which can help for identification/disambiguation. This behavior can be triggered by:
  every description request 32 from the touchpad 11;
  a specific request from the touchpad 11;
  periodically, for a certain period of time (for example, when an application is running on the smartphone).
This notification can be used to better identify the distant object. For example, if two identical descriptions DESCR are received by the touchpad 11, the touchpad 11 can send an additional request to the two distant smartphones. It can request the first distant smartphone 12 to switch on a red LED and request the second distant smartphone to switch on a green LED. This can be further used to uniquely identify the object in the picture. Such an identification request may be sent by the touchpad 11 prior to the step 31 of taking a picture.

The touchpad 11 may iterate the steps of the flow chart of FIG. 3 to successively estimate multiple distances with multiple objects in the room (recording orientation sensors). Then it can estimate its own position in the room, it can also calculate the relative distances between these objects.

If the received description DESCR includes a position of the associated object, an absolute position of the touchpad 11 can be computed.

Figure 5:
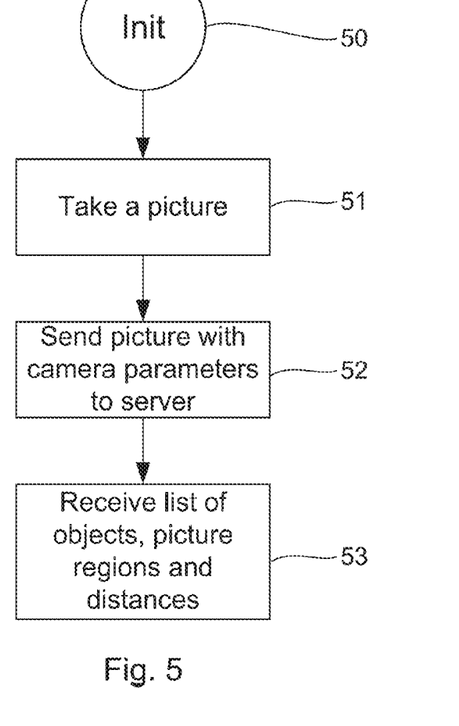
FIG. 5 shows a flow chart of the successive steps implemented by a first communication device according to an alternative embodiment relying on a server assisted distance computation.
Figure 6:
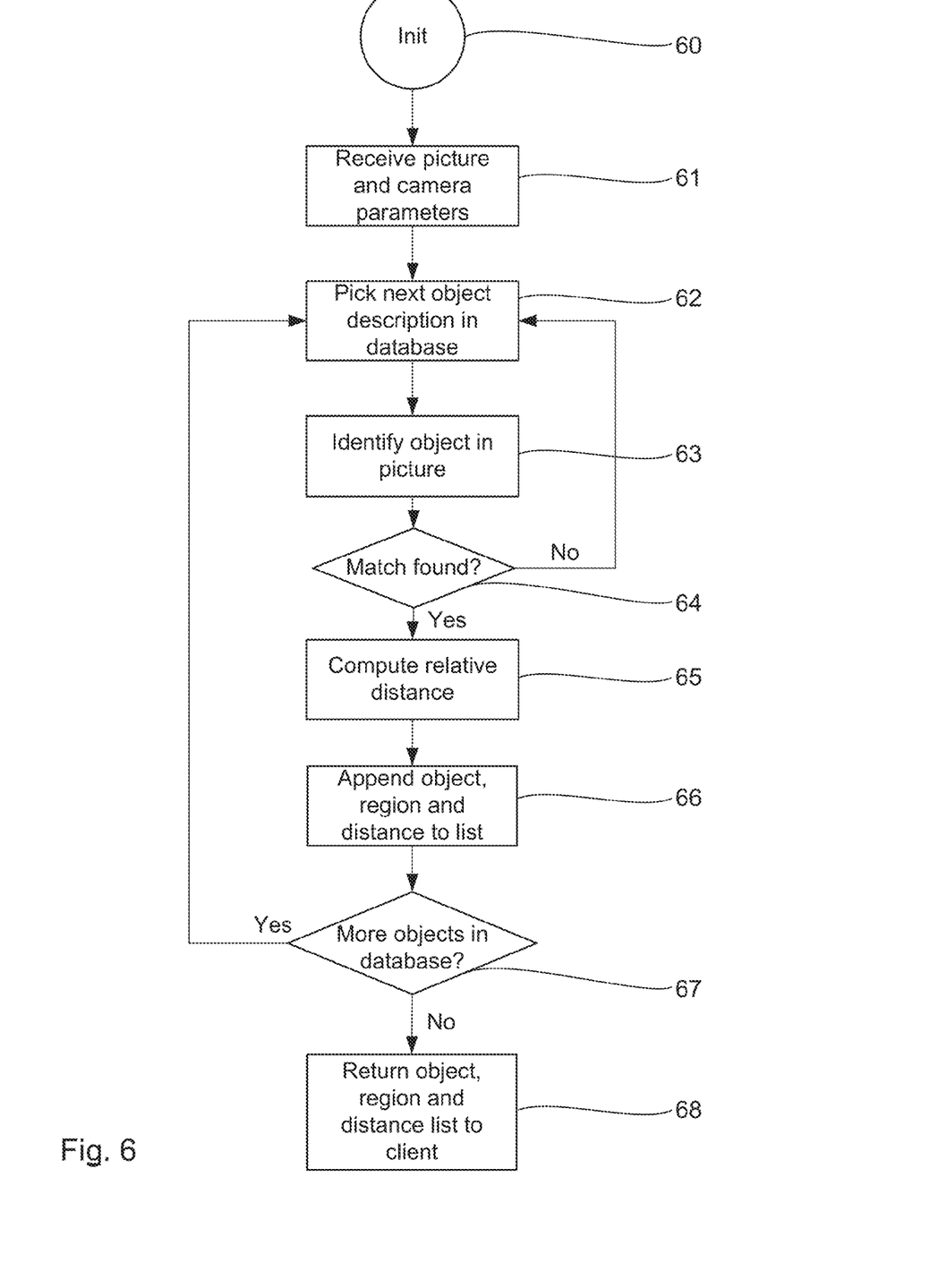
FIG. 6 shows a flow chart of the successive steps implemented by a remote server according to the embodiment of FIG. 5.

FIGS. 5 and 6 show an alternative embodiment of the present invention, according to which the distance estimation is offloaded from the touchpad 11 to a remote server without prior knowledge about the communication devices surrounding it.

As shown on FIG. 5, after an initializing step 50, the touchpad 11 takes a picture at step 51. It then sends a distance measurement request to a remote server, at step 52: this request contains the captured picture, along with some camera parameters, comprising at least the sensor dimensions and the focal length. The remote server then implements the steps shown on the flow chart of FIG. 6, which will be described in close detail hereafter. At step 53, the touchpad 11 receives a list of communication devices, picture regions, and corresponding estimated distances.

As shown on FIG. 6, after an initializing step 60, the remote server receives the distance measurement request sent by the touchpad 11 at step 61. At initializing step 60, the objects, regions and distances lists of the remote server are empty.

Upon reception 61 of the request, the server iterates over all the object descriptions found in its database to find matching objects in the picture. Hence, at step 62, it picks an object description in its database. At step 63, it runs an object recognition algorithm to identify the object in the picture (same process as that described previously for the touchpad 11). If there is no match at step 64, the server gets back to step 62 to pick the next object description in its database.

The request received by the server at step 61 may of course also concern several objects, if the touchpad 11 is interested in knowing the distance to several distinct communication devices.

For each matching object, the server computes the relative distance at step 65, using the object attributes and the received camera parameters, in the same manner as for the algorithm of FIG. 3. At step 66, the server appends the matched object, the picture region in which it is located and the associated estimated distance to a list. Once all objects in the database have been searched for in the picture (test at step 67), the server returns the list of matched objects and their distance, optionally including the coordinates of the objects' bounding rectangle (or region) in the picture, at step 68.

Figure 7:
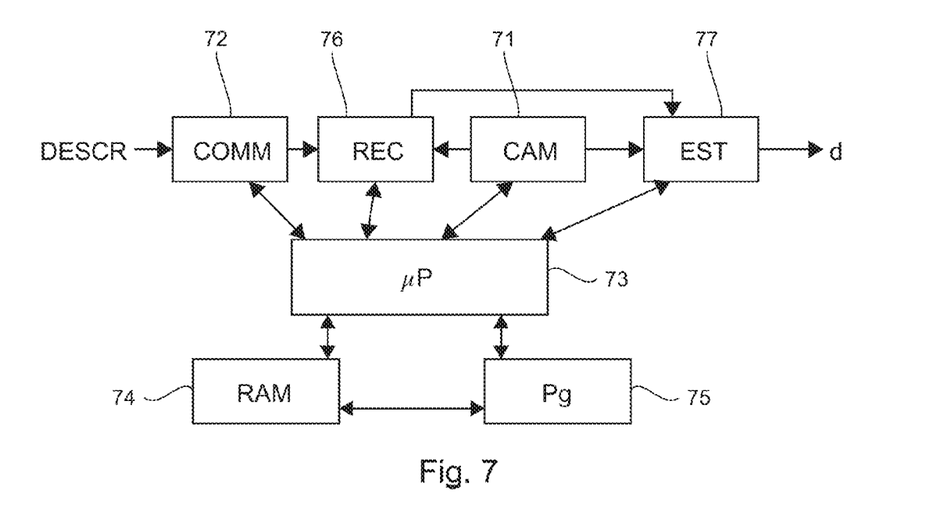
FIG. 7 presents a simplified structure of a communication device, implementing the method for estimating a distance according to FIG. 3.

FIG. 7 presents a simplified structure of a communication device, implementing the method for estimating a distance according to an embodiment of the invention.

Regarding FIG. 7, a communication device according to the invention comprises a memory 74 comprising a buffer memory RAM, a processing unit 73 equipped for example with a microprocessor µP and driven by the computer program 75 implementing the method for estimating a distance according to the invention.

At initialization, the code instructions of the computer program 75 are for example loaded into a RAM and then executed by the processor of the processing unit 73.

According to an embodiment of the invention, the microprocessor of the processing unit 73 implements the steps of the method for estimating a distance described here above according to the instructions of the computer program 75. To this end, the communication device comprises a camera 71 operable to shoot at least one picture of a second communication device. The picture is at least temporarily memorized in a memory module, which may be the RAM 74 or another memory module (not illustrated). The communication device also comprises a wireless communication module 72 comprising a receiver for receiving a description DESCR of the second communication device, said description comprising at least one reference picture of at least part of the second communication device and at least one piece of information on dimensions of the second communication device. The communication device also comprises a recognition module 76 for identifying at least part of the second communication device in said picture, by using said description, and an estimation module 77 for estimating a distance from the first communication device to the second communication device by using:

information on dimensions of the second communication device, camera parameters used for taking the picture of the second communication device, and dimensions of at least part of the second communication device identified in said picture.

Theses modules are controlled by the microprocessor of the processing unit 73; they may be hardware or software modules or a combination of both hardware and software elements.

There are many applications, which may run on a communication device, and which may make use of the relative distance(s) which may be estimated according to embodiments of the invention.

As mere examples, one can think of an inertial navigation system (INS) based on sensors (accelerometer, gyroscope, . . . ), in which the initial position of a smartphone can be determined by taking one picture. The relative distance to two or more objects enables triangulation, provided that the object description contains also position coordinates. With time, the error in positioning will increase; by taking a picture of an object along the path, the position of the smartphone can be adjusted.

Another application of the method according to an embodiment of the invention relies on a multimedia system with multiple displays, in which the relative distance to a screen can be computed by taking a picture. The video stream displayed on that screen can be adjusted, according to the distance between the user and the screen, estimated by the user's smartphone, to save bandwidth without noticeable degradation of the quality by the user.

Another interesting use of the method according to the invention lies in the field of interactive games with multiple smartphones, where the relative distance between the smartphones can be determined by taking a picture of the other smartphone.

The method for estimating relative distance according to embodiments of the invention may also find application for an autonomous robotic vacuum cleaner, which can position itself in the room by taking picture of interactive objects surrounding it.

More generally, the described method may be implemented as a software solution, relying solely on the widely available camera sensor of communication devices and on communication means embedded in the device to acquire information about a distant object. This approach particularly fits the coming Machine-to-machine world, and can be used in all applications where a notion of proximity is needed e.g. for directing a message, a stream, a content to the nearest device. If multiple measurements are available and the location of the identified objects is known,: they can be combined to estimate the device's location.

The invention claimed is:

1. A method for estimating a distance from a first communication device to a second communication device, wherein the method comprises:

Taking a picture of the second communication device by the first communication device;

Receiving from the second communication device a description comprising at least one piece of information related to dimensions of at least part of the second communication device and at least one reference picture of at least part of the second communication device;

Identifying at least part of the second communication device in said picture, by using said description;

Estimating a distance from the first communication device to the second communication device by using:

said at least one piece of information related to dimensions of at least part of the second communication device, and dimensions of said at least part of the second communication device identified in and determined from said picture.

2. The method of claim 1, wherein said description of the second communication device is received by the first communication device through a wireless link established between said first and said second communication devices.

3. The method according to claim 1, wherein said identifying at least part of the second communication device implements an object recognition algorithm on the basis of said at least one reference picture.

4. The method according to claim 1, wherein it also comprises:

matching a portion of said at least part of the second communication device identified in said picture with a portion of said reference picture comprised in said description; and computing a number of pixels associated to the matched portion in said picture.

5. The method of claim 4, wherein estimating the distance d from the first communication device to the second communication device uses the pinhole projection formula:

$$d = f \times \frac{X}{x}$$

where:

f is a focal length of a camera used for taking the picture of the second communication device, X is a real height of said matched portion of the second communication device, is a height of said matched portion in said picture.

6. The method of claim 1, wherein it also comprises:
receiving from said second communication device an estimated distance from the second communication device to the first communication device;
comparing said estimated distance received from said second communication device with the distance estimated by said first communication device.

7. The method of claim 1, wherein said taking a picture, said receiving a description, said identifying and said estimating a distance are carried out for several second communication devices, and wherein said method comprises computing a distance between at least two of said second communication devices.

8. The method of claim 1, wherein said taking a picture, said receiving a description, said identifying and said estimating a distance are carried out for several second communication devices,
and wherein said method comprises estimating a position of said first communication device on the basis of the distances estimated between said first communication device and each of said second communication devices.

9. The method of claim 1, wherein said identifying at least part of a second communication device and said estimating a distance are carried out by said first communication device or by a remote server.

10. A non-transitory computer-readable medium with instructions stored therein which upon execution instruct at least one processor to perform the method for estimating a distance according to claim 1.

11. A communication device comprising:
a camera;
a memory for at least temporarily memorizing a picture of a second communication device taken by the camera;
at least one processor configured to:
identify at least part of the second communication device in said picture, by using a description of the second communication device,
said description comprising at least one piece of information related to dimensions of at least part of the second communication device and at least one reference picture of at least part of the second communication device;
estimate a distance from the first communication device to the second communication device by using:
said at least one piece of information related to dimensions of at least part of the second communication device, and
dimensions of said at least part of the second communication device identified in and determined from said picture,
a receiver for receiving said description from the second communication device.

12. A server for estimating a distance from a first communication device to a second communication device,
wherein the server comprises:
a receiver for receiving from a first communication device a picture taken by the first communication device, a distance measurement request and at least one description of at least one second communication device, said description comprising at least one piece of information related to dimensions of at least part of the second communication device, and at least one reference picture of at least part of the second communication device;
at least one processor configured to:
identify in said picture at least part of at least one second communication device by using said description of the second communication device,
estimate a distance from the first communication device to every second communication device at least partly identified in said picture, said estimation module using:
said at least one piece of information related to dimensions of at least part of the second communication device, and dimensions of said at least part of the second communication device identified and determined from in said picture;
a transmitter for transmitting to the first communication device a list of every second communication device at least partly identified in said picture associated with a corresponding estimated distance.

13. A system for estimating a distance from a first communication device to a second communication device, wherein the system comprises:
said first communication device comprising:
a camera for taking a picture of the second communication device;
a receiver for receiving a description of the second communication device, said description comprising at least one piece of information related to dimensions of at least part of the second communication device, and at least one reference picture of at least part of the second communication device;
at least one processor configured to:
identify at least part of the second communication device in said picture, by using said description;
estimate a distance from the first communication device to the second communication device by using:
said at least one piece of information related to dimensions of at least part of the second communication device,
dimensions of said at least part of the second communication device identified in and determined from said picture, and
a second communication device comprising a receiver for receiving a description request from said first communication device, and a transmitter for transmitting to said first communication device said description or an identifier of said second communication device.

* * * * *